Figure 1:
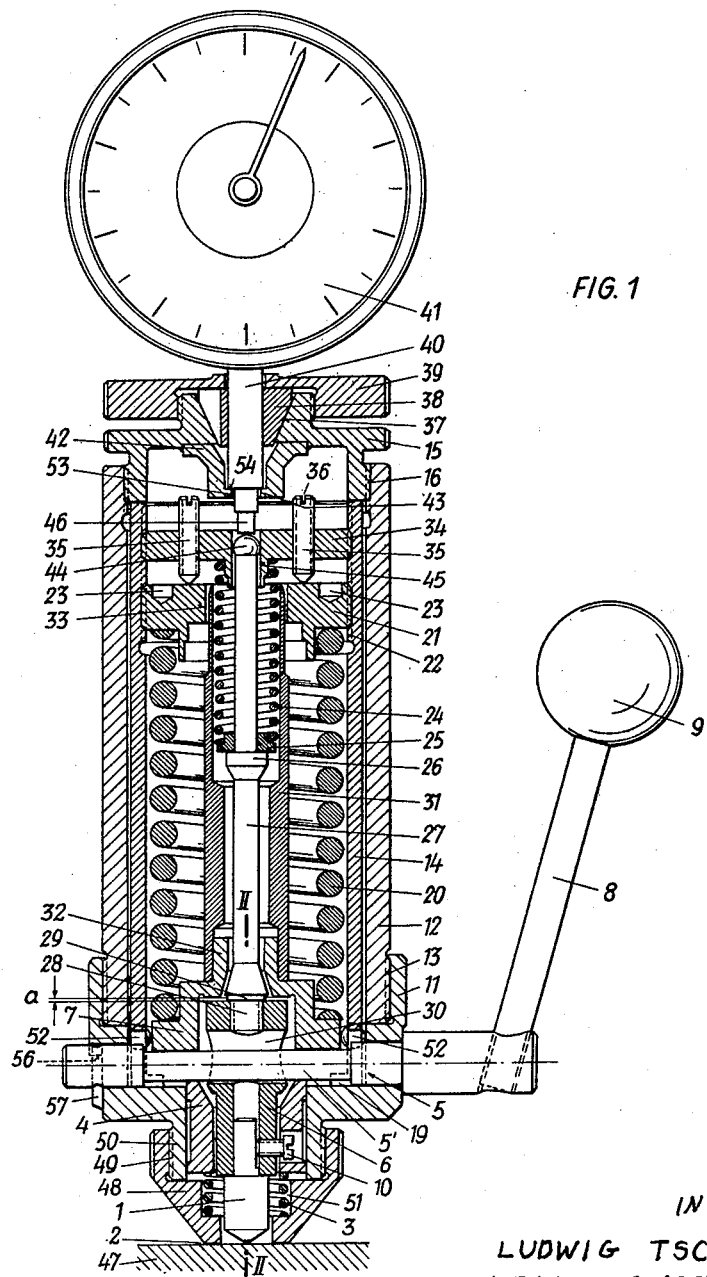

May 11, 1965    L. TSCHIRF ETAL    3,182,491
ROCKWELL HARDNESS TESTING APPARATUS
Filed Dec. 14, 1959    2 Sheets-Sheet 1

INVENTORS
LUDWIG TSCHIRF
FRITZ GARTNER
By
Wenderoth, Lind & Ponack
Attys.

May 11, 1965 L. TSCHIRF ETAL 3,182,491
ROCKWELL HARDNESS TESTING APPARATUS
Filed Dec. 14, 1959 2 Sheets-Sheet 2
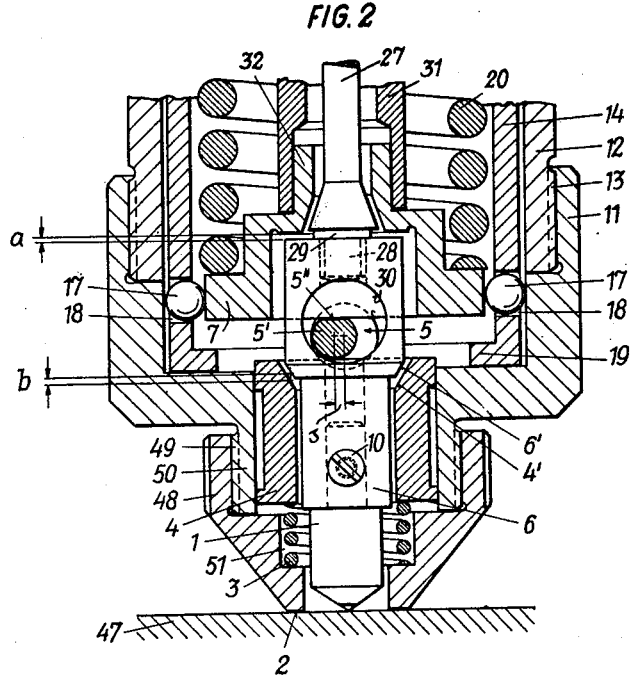
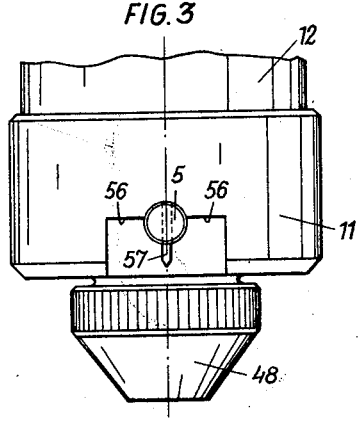
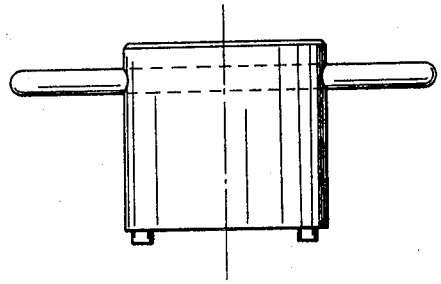
INVENTORS
LUDWIG TSCHIRF
FRITZ GARTNER

United States Patent Office 3,182,491
Patented May 11, 1965

3,182,491
ROCKWELL HARDNESS TESTING APPARATUS
Ludwig Tschirf, Hammerschmidtgasse 33, Vienna XIX, Austria, and Fritz Gärtner, Keisslergasse 18/1, Vienna XIV, Austria
Filed Dec. 14, 1959, Ser. No. 859,265
Claims priority, application Austria, Nov. 13, 1959, A 8,228/59
8 Claims. (Cl. 73—83)

This invention relates to a Rockwell hardness testing apparatus.

In most of the known Rockwell hardness testing apparatus the initial load acts on the plunger of the indenter before the actual testing operation. In this case the point of the indenter often projects over the contact surface of the testing head thus causing contact with the reference plane which is defined by the surface of the test specimen during the test so that the indenter must be lifted from the specimen to the reference plane during the gripping of the test specimen. Particularly in portable hardness testing apparatus this mode of operation may involve damage to the indenter during the gripping operation and errors may enter into the measurement if the contact surface of the apparatus slides on the test specimen during gripping.

In the Rockwell hardness testing apparatus according to the invention these disadvantages are avoided in that it comprises a retracting device which retracts the indenter behind the gripping surface.

In one embodiment of the invention the retracting device comprises a spring, which is disposed between the testing head and a bushing slidably guided in the base member and mounting the plunger firmly connected to the indenter, by which spring the bushing is held against an eccentric which is rotatably mounted in the base member and the bushing, is provided with engaging faces which during the upward movement of the eccentric engage stops provided on the base member.

A particularly simple testing apparatus is obtained if, according to a further feature of the invention, a single eccentric is provided for operating the retracting device and for applying the added load.

According to the invention the central part of the eccentric is preferably flattened on one side and the flat when in a position normal to the longitudinal axis of the apparatus determines the initial load position.

In a development of the invention the apparatus is provided, preferably at its base member, with stops for a pin or the like carried by the eccentric, which stops determine the retracted position and the main load position.

A further feature of the invention consists therein that a feeler pin extending between the plunger and the dial gauge substantially along the axis of the apparatus is at its top end mounted in a pendulum bearing, the latter for example being a ball. This obviates damaging of the indenter tip if during the testing operation, a minimal lateral displacement of the piece to be tested with respect to the gripping surface should take place, should the testing piece be subjected to a heavy transverse force. Furthermore all friction influences on the accuracy of the measurement are obviated since no other bearing of the plunger and feeler pin than at the top end of the latter is provided.

Further details and advantages of the invention will be explained hereinafter with reference to the accompanying drawings, FIG. 1 is a longitudinal sectional view showing an embodiment of a portable Rockwell hardness testing apparatus according to the invention, carrying a dial gauge, in the initial load position. FIG. 2 is an enlarged sectional view taken on line II—II of FIG. 1 and showing the arrangement of the eccentric. FIG. 3 is an elevation showing an arrangement of stops by which the retracted position and the main load position are determined. FIG. 4 is a side view illustrating a key for the operation of the testing apparatus according to the invention.

A housing consisting of an outer sleeve 12 and a base member 11 firmly screwed thereto by a screw thread 13 accommodates the added load spring 20 and the initial load spring 24, which produces the initial load of, e.g., 10 kilograms required in the Rockwell hardness testing method. The added load spring 20 is contained in a spring bushing 14, which is screwed into the outer sleeve 12 by means of a screw cover 15 having an external screw thread 16.

The screw cover 15 has a conical opening 37, through which a slotted clamping cone 38 is pulled by a cap nut 39 to clamp the shaft 40 of the dial gauge 41. A pot-shaped part 42 welded to the underside of the screw cover 15 has a flat bottom surface 43, which is formed with an opening 53 and forms a lower stop 54 for the shaft 40 of the dial gauge.

The feeler pin 27 of the apparatus carries at its top end a ball 44, which is centrally guided in a bore 45 of the screw 34, and establishes a connection to the feeler pin 46 of the dial gauge 41.

The added load spring 20 is stressed by a screw 21 which has holes 23 and is screwed into a screw thread 22 provided on the inside of the spring bushing 14. The holes 23 serve for tightening the screw 21 in order to adjust the added load spring 20. An appropriate key (FIG. 4) can be inserted into the holes 23.

The initial load spring 24 is strained by the screw 34, which is screwed into the screw thread 22 of the spring bushing 14. Locking screws 35 provided in the screw 34 have conically tapered ends bearing on the surface of the screw 21 also screwed into the screw thread 22 of the spring bushing 14 to lock the two screws 21, 34 in the spring bushing 14. Screwdriver slots 36 serve for tightening the screws 35.

The base member 11 has a depending cylindrical extension 50, which has a screw thread 49 on which the conical testing head 48 is screwed, the gripping surface 2 of which coincides with the test surface of the test specimen 47 if the apparatus is correctly fixed. The base member 11 has slidably guided therein a bushing 4, in which the plunger 6 is mounted, which is firmly connected to the indenter 1, e.g., with a screw 10. In a cavity 51 formed in the interior of the testing head 48 a spring 3 is arranged between the bushing 4 and the testing head 48 and urges the bushing 4 against an eccentric 5 which is rotatably mounted in the base member 11 and is provided at one end with an eccentric lever 8 having a ball handle 9. Spring 3 exerts a force greater than the force of initial load spring 24. The eccentric 5 has preferably a unilaterally flattened central portion 5' and extends clear through a bore 30 which is at right angles to the longitudinal axis of the plunger 6.

The initial load spring 24 acts through the intermediary of a spring plate 25 on a collar 26 of the feeler pin 27, which is rigidly connected by a screw thread 28 to the plunger 6. Above the screw thread 28 the feeler pin 27 is enlarged to form a shoulder 29, which engages the plunger 6. The initial load spring 24 is located in a tube 31 the lower part of which is forced on a cylindrical extension 32 of the spring plate 7 controlled by the eccentric 5. The upper part of the tube 31 is guided in a bore 33 of the screw 21.

Some spacing balls 17 serve for centering the spring plate 7 relative to the base member 11. These balls are embraced by the spring bushing 14 at a bore 18 thereof. The spring bushing 14 bears on the base member 11 by means of an inwardly directed flange 19. The spring bushing 14 has also two diametrically opposite apertures 52 for the outer parts of the eccentric 5.

To perform a hardness test, the testing head 48 of the apparatus is applied to the test specimen 47 while the indenter is in retracted position, the spring 3 being relaxed and the springs 24 and 20 being stressed, and is clamped on the specimen with a force which exceeds the test load. The eccentric 5 is then lowered by means of the eccentric lever 8 to move the apparatus into the initial load position shown in FIG. 1, in which the spring 3 is strained and the initial load spring 24 is relaxed whereby the initial load of 10 kilograms is applied to the test specimen 47. To retain the ececntric 5 in this position it is preferably provided with a flat 5″, which in this position lies snugly against the spring plate 7 (FIG. 2). A further rotation of the eccentric 5 causes the added load spring 20 to relax whereby the main load, which consists of the initial and added loads, is gradually applied. After the added load has been removed by returning the eccentric 5 to the initial load position the hardness value is read while the initial load is reapplied. The return movement of the eccentric 5 is then continued to move the apparatus to the retracted position, in which the point of the indenter 1 is retracted behind the gripping surface 2 of the testing head 48 and is thus protected from being damaged. This retraction is effected by contacting of the centrifying face 4′ of the bushing 4 with the counter faces or stops 6′ of the plunger 6, the latter being thereby lifted together with the indentor 1 centrically behind the gripping surface 2.

To simplify the operation of the apparatus it is recommendable to provide stops 56 for a pin 57 or the like carried by the eccentric 5 in order to limit the rotation of the eccentric. These stops are preferably provided on the base member 11. The pin 57 engages one of these stops 56 in the retracted position and another in the main load position (FIG. 3).

FIG. 2 shows distinctly the geometrical relations which must be observed to ensure a satisfactory function of the apparatus: The eccentricity $s$, i.e. half of the stroke of the eccentric, must be larger than the vertical clearance $a$ between the spring plate 7 and the plunger 6 and must also be larger than the vertical clearance $b$ between the stops 6′ of the plunger 6 and the engaging faces 4′ of the bushing 4.

The hardness testing apparatus according to the invention may be used in a known manner as a stationary apparatus or, when inserted in special straining devices for various testing purposes, as a portable apparatus.

What we claim is:

1. Rockwell hardness testing apparatus comprising an indenter, elements for producing an initial load and a main load, a mechanism including a plunger for applying said loads to and removing said loads from the indenter, said indenter being firmly connected to said plunger, means for measuring the indenting depth operably connected to said plunger, a retracting device for the indenter, characterized in that for the successive application of the initial load, of the main load and for retracting the indenter a single lever is provided, said retracting device comprising a testing head surrounding said indenter and having a specimen engaging gripping surface, a base member rigidly connected to said testing head, a bushing slidably guided in said base member, a spring connected between said head and said bushing, an eccentric rotatably mounted in said base member against which said bushing is held by said spring, said lever being operatively connected to rotate said eccentric, said bushing engaging a portion of said plunger upon rotation of said eccentric, said plunger together with said indenter thereby being lifted behind the gripping surface.

2. A Rockwell hardness testing apparatus as claimed in claim 1, wherein the apparatus is provided with rotation limiting stops for said eccentric, which stops determine the indenter retracted position and the main load position of said eccentric.

3. A Rockwell hardness testing apparatus as claimed in claim 2, wherein said stops are carried by the base member.

4. A Rockwell hardness testing apparatus as claimed in claim 1, wherein the central part of said eccentric is unilaterally flattened and the flat when in a position normal to the longitudinal axis of the apparatus determines the initial load position of said eccentric.

5. Rockwell hardness testing apparatus as claimed in claim 1 including cooperating conical surfaces on said bushing and said plunger whereby said plunger is held centrally to said bushing when said indenter is retracted.

6. Rockwell hardness testing apparatus as claimed in claim 1, wherein a pin is carried by said eccentric, and stops are provided for said pin on said base member.

7. Rockwell hardness testing apparatus as claimed in claim 1, wherein the elements for producing the initial and the main loads comprise a sleeve and springs jointly mounted within said sleeve.

8. Rockwell hardness testing apparatus as claimed in claim 1, wherein said means for measuring the indenting depth comprises a dial gauge and a feeler pin extending between said plunger and said dial gauge.

References Cited by the Examiner

UNITED STATES PATENTS

| | | | |
|---|---|---|---|
| 2,053,472 | 9/36 | Gogan | 73—83 |
| 2,652,718 | 9/53 | Wiseman | 73—81 X |
| 2,685,197 | 8/54 | Mennesson | 73—81 |

FOREIGN PATENTS 760,828 11/56 Great Britain.

RICHARD C. QUEISSER, *Primary Examiner.*

C. A. CUTTING, ROBERT L. EVANS, JOSEPH P. STRIZAK, *Examiners.*